(12) United States Patent
Hansen et al.

(10) Patent No.: US 9,288,951 B2
(45) Date of Patent: Mar. 22, 2016

(54) METHOD AND APPARATUS FOR AEROPONIC GROWTH

(71) Applicants: Karen Hansen, Sheridan, OR (US); Jeffrey Lawrence Harlan, Corona, CA (US)

(72) Inventors: Karen Hansen, Sheridan, OR (US); Jeffrey Lawrence Harlan, Corona, CA (US)

(*) Notice: Subject to any disclaimer, the term of this patent is extended or adjusted under 35 U.S.C. 154(b) by 0 days.

(21) Appl. No.: 14/635,998

(22) Filed: Mar. 2, 2015

(65) Prior Publication Data

US 2015/0173316 A1    Jun. 25, 2015

Related U.S. Application Data

(63) Continuation of application No. 13/550,349, filed on Jul. 16, 2012, now Pat. No. 8,984,807.

(60) Provisional application No. 61/508,598, filed on Jul. 15, 2011.

(51) Int. Cl.
*A01G 31/02* (2006.01)
*A01G 9/02* (2006.01)
*A01G 9/10* (2006.01)

(52) U.S. Cl.
CPC ..................................... *A01G 31/02* (2013.01)

(58) Field of Classification Search
CPC . A01G 2009/1053; A01G 9/02; A01G 9/021; A01G 9/10; A01G 9/1073; A01G 31/02; A47G 7/00; A47G 7/02; A47G 7/06
See application file for complete search history.

(56) References Cited

U.S. PATENT DOCUMENTS

| | | | | |
|---|---|---|---|---|
| 1,621,440 A * | 3/1927 | Stoddard | ................ | A01G 13/04 47/31.1 |
| 2,502,910 A * | 4/1950 | Wilcox | ................ | A01G 9/1423 47/18 |
| 2,592,976 A * | 4/1952 | Thomas | ................ | A01G 31/02 47/18 |
| 3,849,932 A * | 11/1974 | Adams | ................ | B65D 25/04 206/423 |
| 4,178,715 A * | 12/1979 | Greenbaum | ........... | A01G 9/028 47/48.5 |
| 4,250,663 A * | 2/1981 | Merritt | ..................... | A01G 9/10 206/557 |
| 5,010,686 A * | 4/1991 | Rivest | .................... | A01G 31/02 47/62 C |
| 6,061,957 A * | 5/2000 | Takashima | ............. | A01G 31/02 47/21.1 |
| 6,276,089 B1 * | 8/2001 | Boisclair | ................ | A01G 31/02 47/60 |
| 6,332,287 B1 | 12/2001 | Geraldson | | |
| 6,837,002 B2 * | 1/2005 | Costa | ..................... | A01G 31/02 47/60 |
| 6,951,076 B2 * | 10/2005 | Winsbury | .............. | A01G 31/02 47/59 R |
| 2005/0241231 A1 | 11/2005 | Bissonnette et al. | | |
| 2008/0078118 A1 | 4/2008 | Bissonnette et al. | | |
| 2008/0155894 A1 | 7/2008 | Bissonnette et al. | | |
| 2010/0037517 A1 | 2/2010 | Copping et al. | | |
| 2012/0291349 A1 * | 11/2012 | Teng | ............................... | 47/65.7 |
| 2014/0190077 A1 * | 7/2014 | Burmann | ................. | A01G 9/02 47/66.1 |

FOREIGN PATENT DOCUMENTS

AU    200126413 A1    6/2001

* cited by examiner

*Primary Examiner* — Monica Williams
(74) *Attorney, Agent, or Firm* — George P White

(57) ABSTRACT

A system for growing plants without soil uses removable V-shaped baskets to support plants in a tiered, self-contained unit. Nutrient enriched water is sprayed on the plant roots. The roots are held by perforations in the elongated V-shaped basket and a plant blanket. The unit is multilevel and can be set over an aquarium. The growing shelf can have a worm bag in order to add natural nutrients. Baskets can be comprised of a pair of identical halves that can be readily mutually coupled. Coupling mechanisms can include those that snap together and those providing for a pivoting coupling.

3 Claims, 15 Drawing Sheets

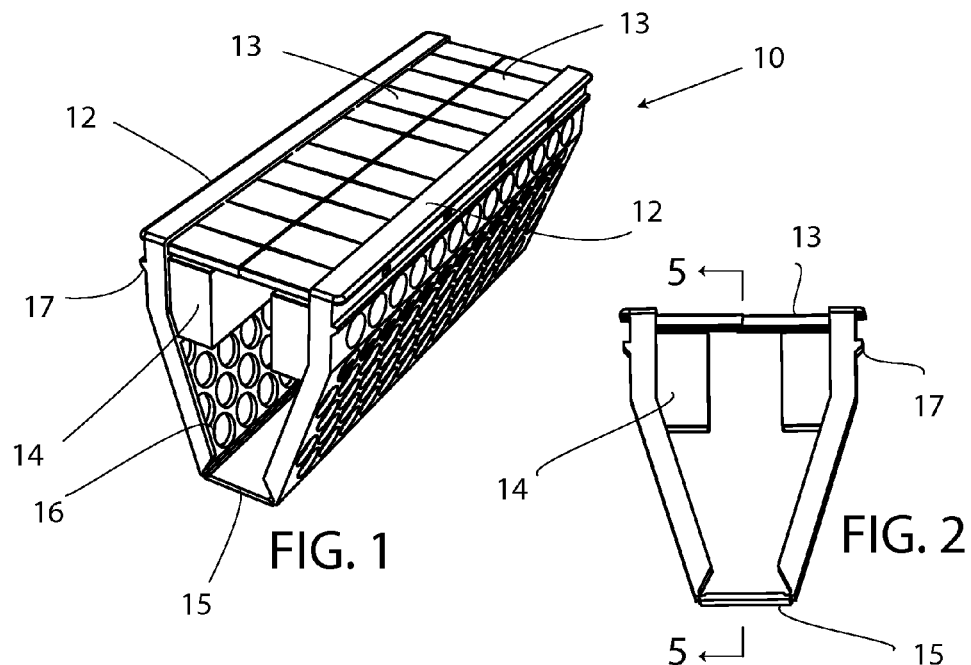
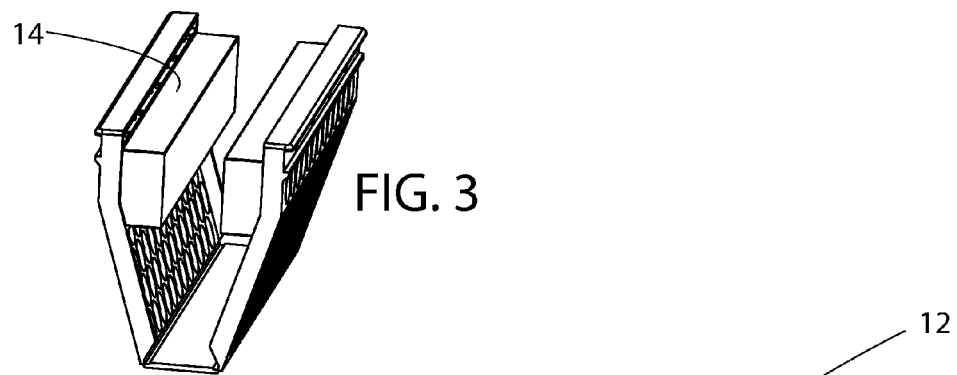
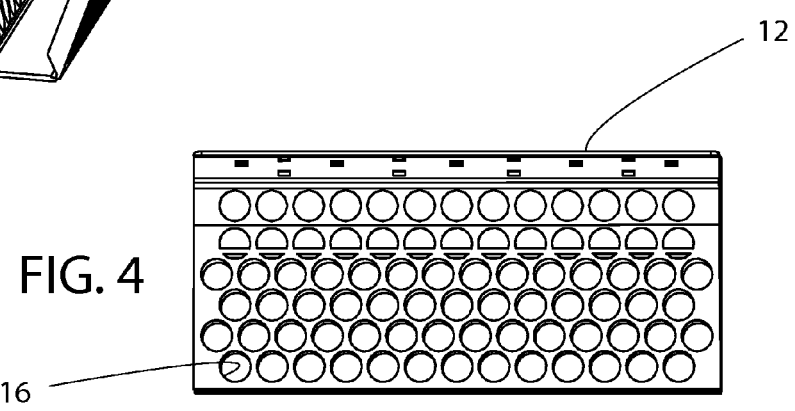

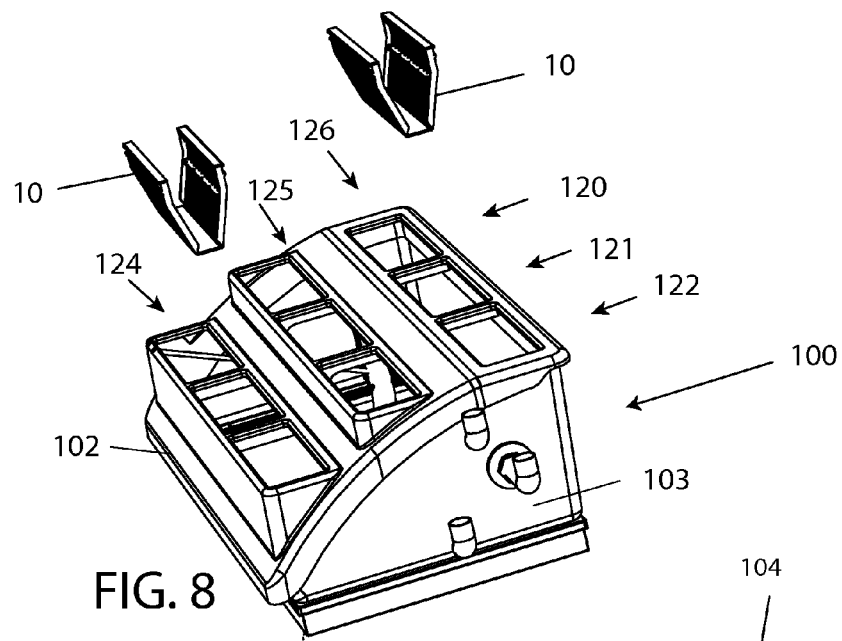
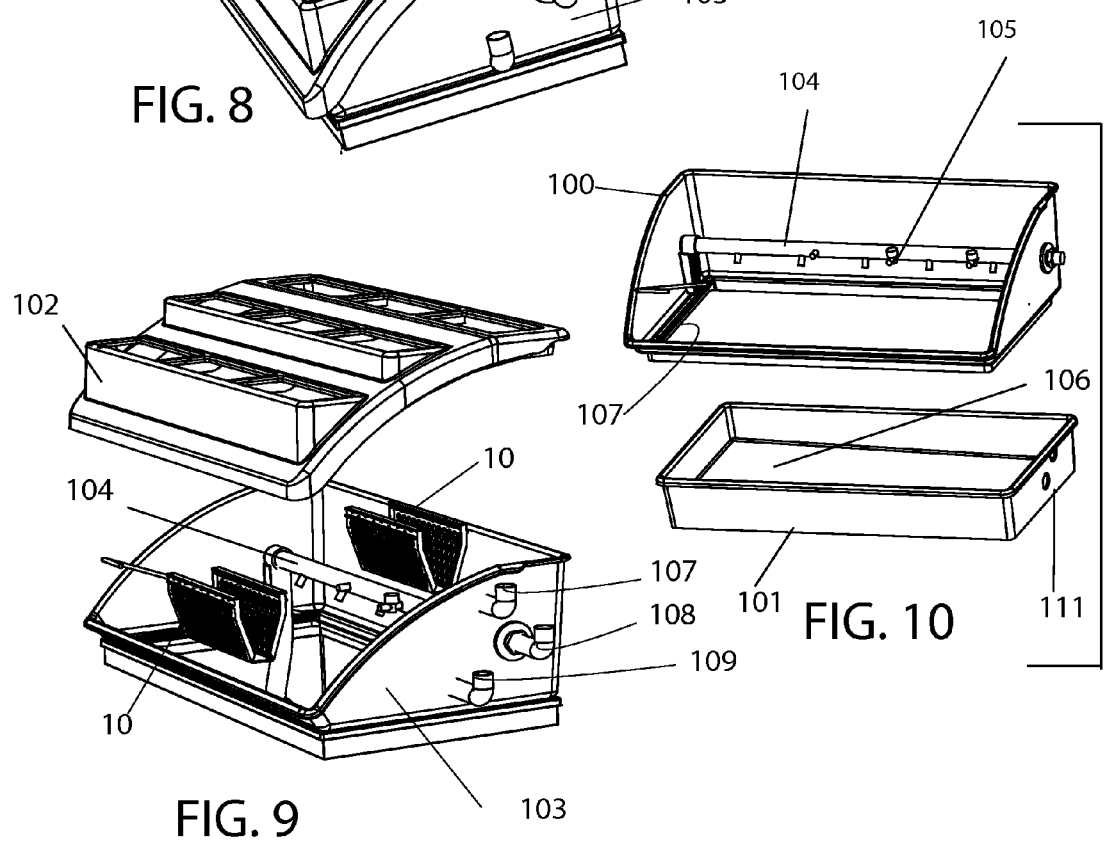

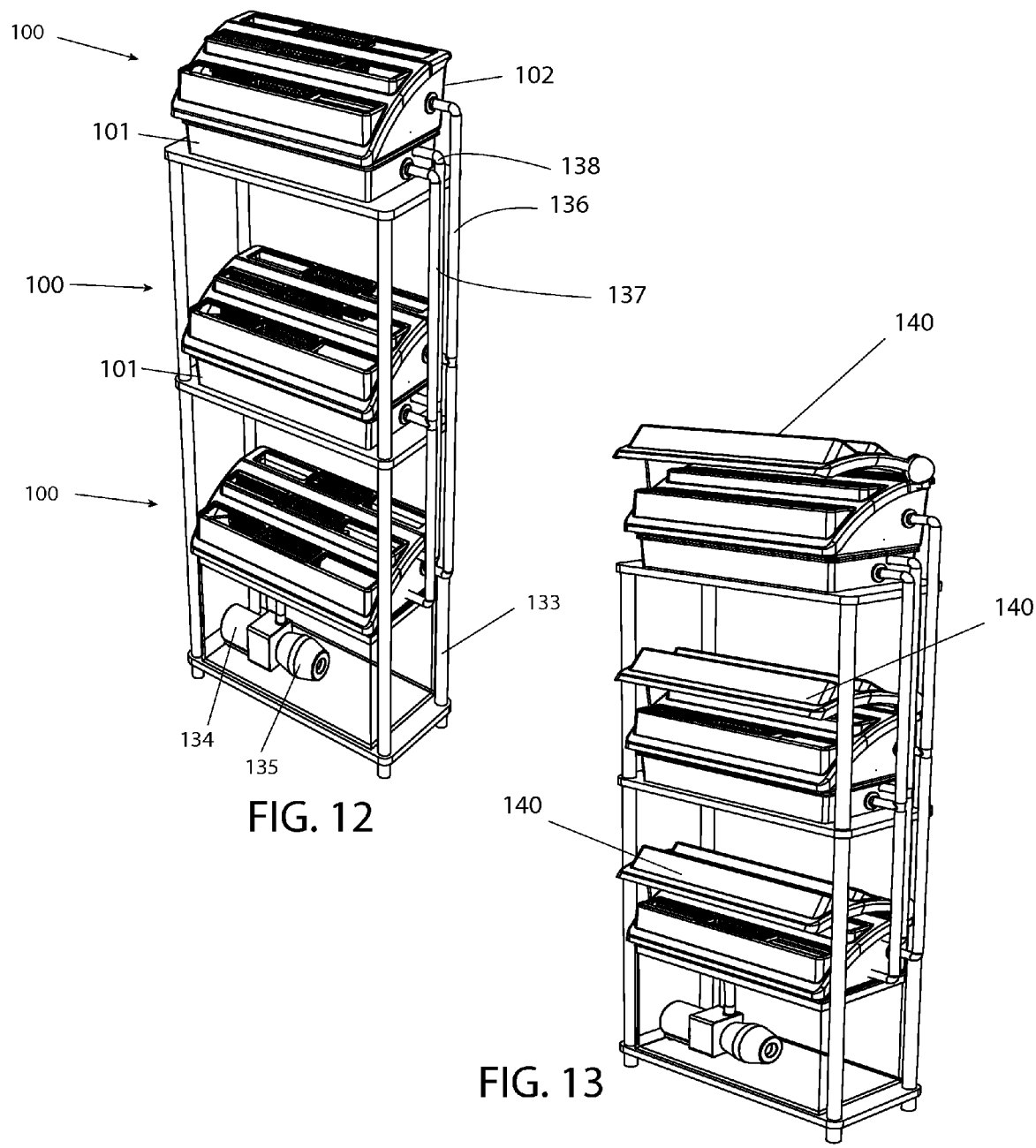

METHOD AND APPARATUS FOR AEROPONIC GROWTH

RELATED APPLICATIONS

This application claims the benefit of co-pending non-provisional U.S. application Ser. No. 13/550,349, filed on Jul. 16, 2012, which in turn claims the benefit of U.S. provisional application 61/508,598, filed on Jul. 15, 2011. The above applications are hereby incorporated herein in their entirety.

FIELD

This pertains to the growing of plants without requirement for a solid medium; it is particularly drawn to hydroponic growth wherein plant roots do not rest in water continually.

BACKGROUND

Aeroponic plant growth is plant husbandry without soil and without roots continually immersed in water, as is the case normally in hydroponics. Most aeroponic systems, while not employing soil, do require a medium for roots to gather around. Clay pebbles are often used. In aeroponic systems roots can be watered by intervals of periodically resting in water followed by intervals of being only in air. Alternatively, roots in air can be sprayed with water. Aeroponic techniques have long been proven as a viable and efficient method of plant growth but have not found widespread acceptance for several reasons.

SUMMARY

The methods and apparatus of these teachings can involve V-shaped or U-shaped, perforated baskets. Each basket may hold multiple plants. Multiple plants in one basket can be in close enough adjacency for their respective roots to comingle. The V or U-shaped basket can be comprised of two separate, generally symmetric or mirror image, sides. In that case the sides can be mutually coupled and decoupled. This can allow for a more effective access to the plants and roots.

Particularly when plants are young and small, they can be supported in a generally upright position in the basket by a plant collar or plant blanket of a fabric material along an upper edge of the V-shaped basket. These configurations can dispense with clay pebbles or other root support material. The collar can include a foam material for plant support and for retention of moisture. Multiple baskets can each rest in rectangular openings in a tiered, hollow base. The base can contain plumbing for nutrient-bearing water that can be sprayed in a mist on the roots extending through the perforations. Multiple tiered bases can be mounted vertically with their plumbing interconnected into a closed-loop system. Placing an aquarium in fluid communication with the aeroponic system can create an aquaculture system. The addition of sequestered worms can result in a system of organic cyclic growth of plants and fish.

BRIEF DESCRIPTION OF THE DRAWINGS

FIG. 1 shows a perspective view of a first example basket for supporting multiple plants with a collar and a multi-fingered plant blanket;

FIG. 2 shows a side view of the basket of FIG. 1;

FIG. 3 shows a view of the basket of FIG. 1 without the plant blanket;

FIG. 4 shows a front view of the basket of FIG. 1;

FIG. 8 is a shelf unit with positions for supporting nine baskets;

FIG. 9 is the unit of FIG. 8 exploded with the cover off the base;

FIG. 10 is the base portion of FIG. 9 above a catch-pan;

FIG. 12 shows a three-shelf aeroponic unit with the lower unit on a fish tank;

FIG. 13 shows the unit of FIG. 12 with the addition of light hoods over each shelf unit;

DETAILED DESCRIPTION

Figure 5:
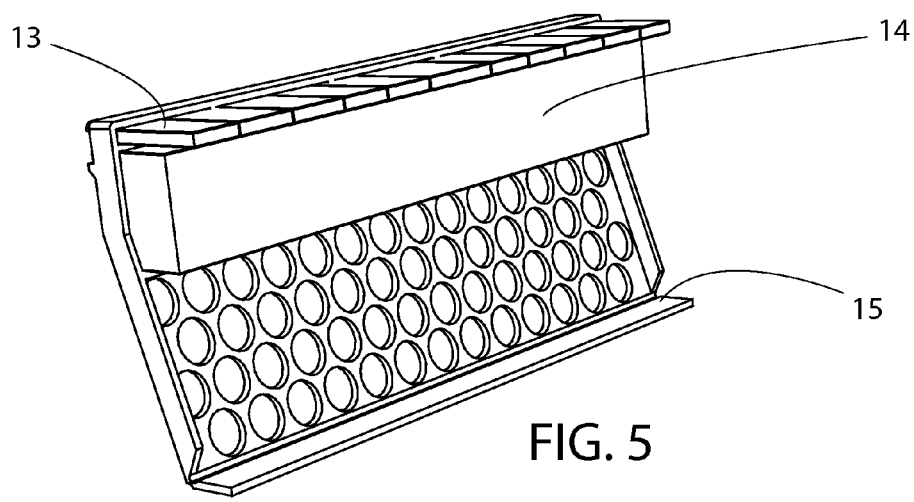
FIG. 5 is a cut-away perspective view of the basket of FIG. 2 along 5-5.

Reference herein to "one embodiment" or "an embodiment" means that a particular feature, structure, operation, or other characteristics described in connection with the embodiment may be included in at least one implementation of the invention. However, the appearance of the phrase "in one embodiment" or "in an embodiment" in various places in the specification does not necessarily refer to the same embodiment.

In conjunction with the included drawings, this detailed description is intended to impart an understanding of the teachings herein and not to define their metes and bounds.

Basket Structure—First Embodiment

A first example basket embodiment is illustrated in the FIGS. 1-7. FIG. 1 shows a perspective view of an aeroponic growing basket 10. It has two parallel upper edges 12. Each upper edge is the upper terminus of a planar sidewall perforated with holes 16. The sidewalls, in profile, form a generally V-shape ending at the bottom 15. As shown in FIG. 2 this is not strictly a V-shape in that the two sides do not meet in a point. It might more accurately be referred to as a U-shaped basket or an inverted isosceles trapezoidal shape.

The upper edges each have an opposing multi-fingered "plant blanket" 13 facing each other and bridging the open gap from one upper edge to the other. The blanket can be of a felt material. Below the blanket are foam blocks 14 attached to each perforated sidewall. Together they comprise a collar.

The side view of FIG. 2 illustrates the symmetry of the shape of the basket. Near the top edge of either side is a protrusion 17 to be engaged with an opening in a supporting structure into which the basket might be placed. FIG. 3 shows a basket without the multi-fingered plant blanket 13 for better visibility of the foam 100 blocks.

Figure 6:
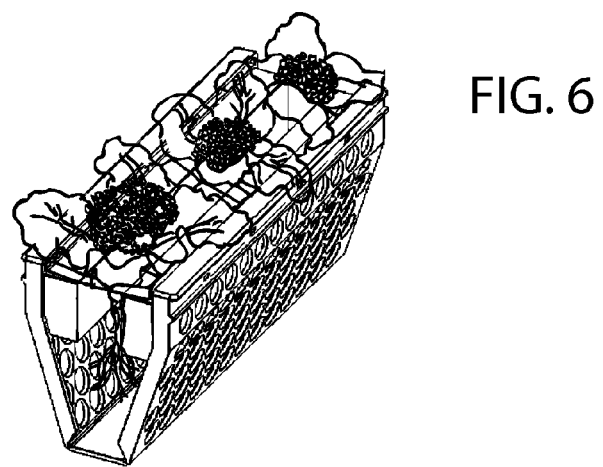
FIG. 6 shows the first example basket with plants growing in it.
Figure 7:
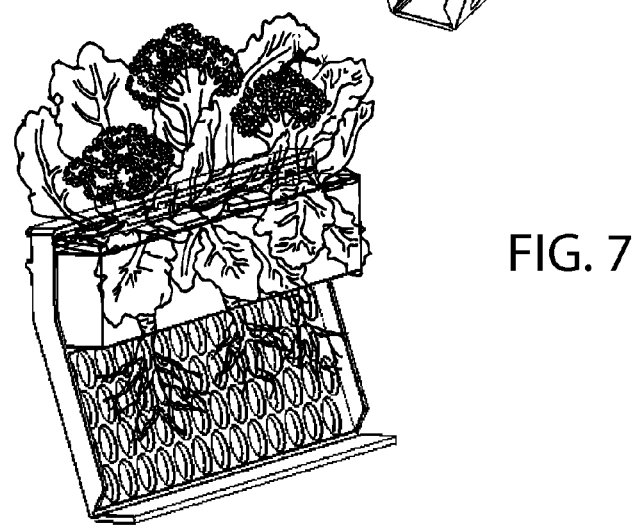
FIG. 7 shows the first example basket with plants growing in it in a cut-away view.

The front of the basket with its array of perforations is seen in FIG. 4; while FIG. 5 shows a cut-away view allowing the length of the foam block 14 and blanket 13. In FIGS. 6 and 7 plants are illustrated growing in the basket. One attribute of the elongated and perforated baskets is their ability to hold several plants in very close 105 proximity.

Basket—Operations

Small plants are placed in the baskets with roots towards the bottom and the stalk or stem extending upward to be gently captured by the foam collar. For plant growth, the baskets are placed in a light-tight environment with only the upper 110 edges and plant stalk or stem in the light. The dark lower portion is provided with a nutrient rich moist environment. Moisture is captured, retained, and released by the foam blocks. Light reaches the green portions of the plant but does not significantly reach the roots because of the light blocking effect of the multi-fingered, felt plant blanket. When fully grown, the plants can be removed, relocated or remain to be 115 harvested by leaf sizes.

Multiple plants of the same type are generally placed together with intermingled roots in a single basket. As the plants grow the basket may be relocated to other environments with different moisture properties or to accommodate the increasing plant height. When fully grown, the plants can be removed and harvested.

Basket Supporting Structure

Individual baskets are supported in a multi-tiered shelf unit 100 in FIG. 8. This example shelf unit can support nine total baskets 10 in that it has three rows 124 125 126 and three columns 120 121 122 of rectangular openings for aeroponic 125 growing baskets. The baskets fit snuggly into the rectangular openings and are held in place via the protrusions discussed above. The inside of the shelf unit is blocked off from light. FIG. 9 shows the same shelf unit with its cover 102 removed from its base 103. A pipe 104 with spray nozzles is seem inside the base running from the right to the left. The nozzles are better seen in FIG. 10 with the top removed completely. The nutrient bearing spray water is supplied to the unit via an inlet fitting 107. A drain fitting 109 and an overflow fitting 108 complete the plumbing requirements of the unit.

Figure 11:
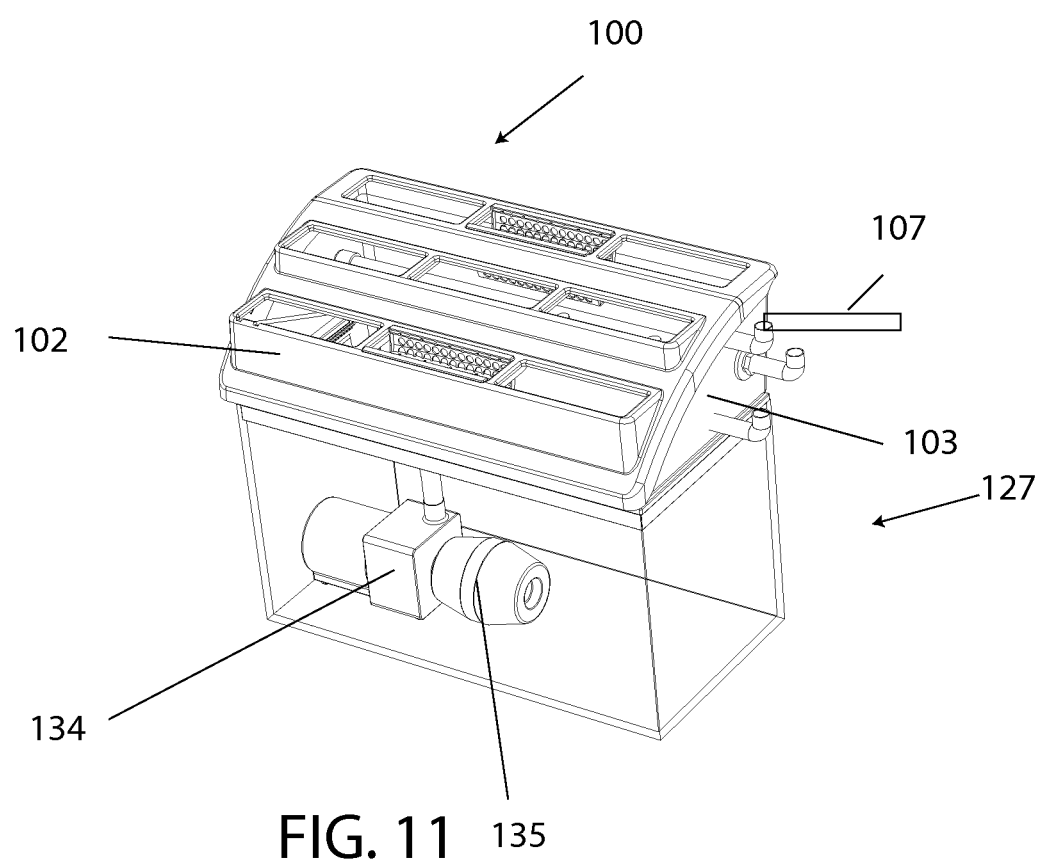
FIG. 11 shows a shelf unit on a fish tank with a pump to circulate water to the aeroponic unit.
Figure 14:
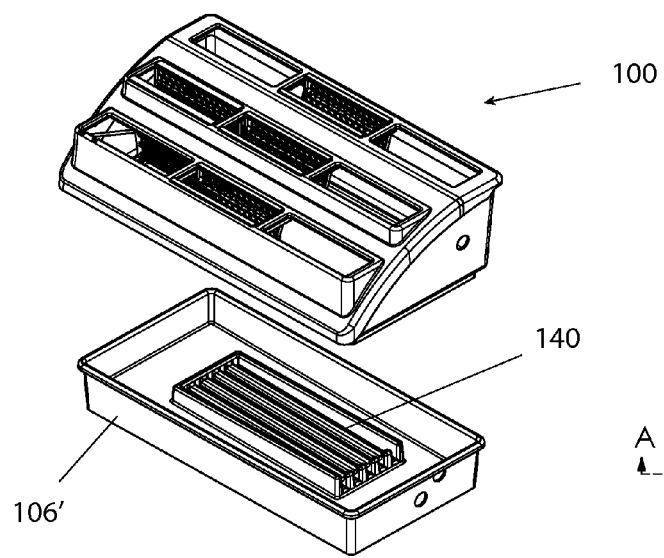
FIG. 14 shows a shelf unit over a catch-pan with a worm platform.
Figure 15:
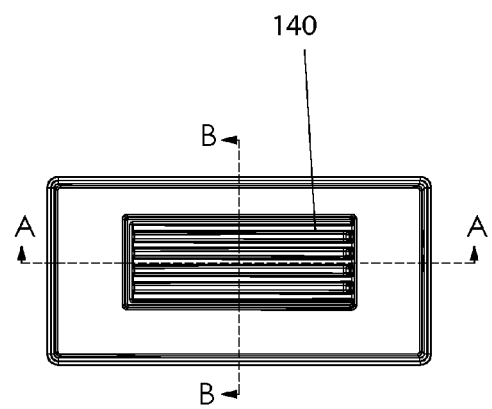
FIG. 15 is a plan view of the catch-pan of FIG. 11.
Figure 16:
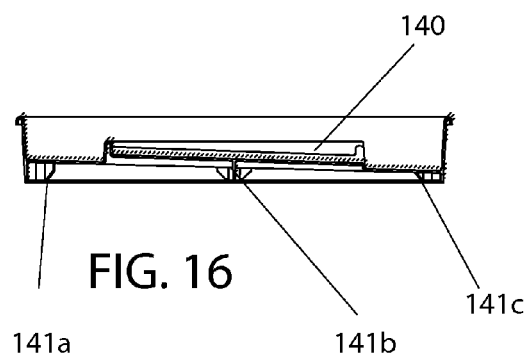
FIG. 16 is a cut-away view of the catch-pan along A-A.
Figure 17:
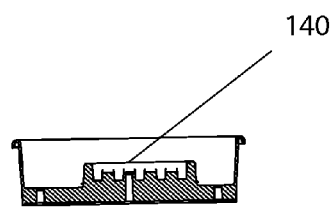
FIG. 17 is a cut-away view of the catch-pan of FIG. 15 along B-B.

FIG. 10 shows the base with its open frame 107 over a catch-pan 101. The catch-pan has a sloped floor 106 that directs the water from the spraying to an opening 111 for draining via fitting 109 seen in FIG. 9. One configuration for use of the shelf unit is placed above a fish tank 127 as seen in FIG. 11. The fish tank water is part of a closed system for providing nutrients to fish and plants. A pump 134 with a filter 135 pumps fish tank water to the water intake fitting 107 with sufficient pressure to cause the required mist spray. No catch-pan is used and the sprayed water simply falls back into the fish tank.

For practical purposes many system embodiments will have three tiers of shelf units as seem in FIGS. 12 and 13. The lower portion of FIG. 12 is the unit of FIG. 11. In addition a structure 133 has platforms for two additional shelf units. The upper and middle aeroponic units do have catch-pans 101 tied together by a pumping system. The pumped fish tank water is fed under pressure to the intake fittings of all three units via a water source pipe 136. A drainpipe 137 brings the water from the two catch-pans down to the fish tank. If the drain system were to get clogged, an overflow system comprising an overflow pipe 138 would act as a supplemental drain.

FIG. 13 shows the system of FIG. 12 with the addition of light hoods 140 over each of the shelf units.

Alternative Catch—Pan

FIGS. 14-17 show various views of an alternative catch-pan. This version has a worm bag support tray 148. It is raised above the level of the pan floor 106'. As 155 seen in the cut-away view of FIG. 16, the tray is held up by feet 141a 141b 141c. This allows worms that might be in a mesh bag on the tray to move from under water, to in water, to out of water.

Operation

Water is pumped from a reservoir to the plumbing for the spray units. The water has a nutrient added to it. The spray is directed to the plant roots. Water drains downward, possibly into an aquarium. A worm bag may be placed on the floor of the growing shelf. Seedlings are placed adjacent to each other in a V-shaped perforated basket. The basket is placed in a growing site of a tiered growing shelf. Water with nutrients is sprayed on the seedling roots. No soil, clay pebbles, or other additional structure is required. The water that drips down is recaptured to be recycled through the system and in some applications involves the drained water that is provided to a large lower tank appropriate for fish to live in below the growing shelf.

With a balance of plants, fish, and worms, a generally self-sustaining semi-closed system can be attained. The plants, worms, and fish provide for each other in a symbiotic manner.

Second Embodiment Basket

Figure 18:
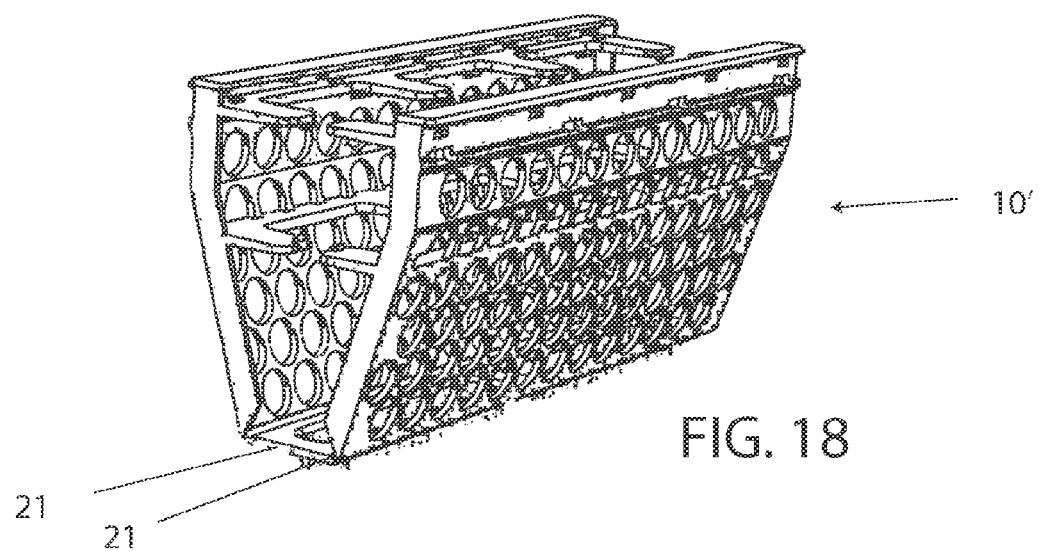
FIGS. 18 and 19 show perspective views of a second embodiment basket compromised of two symmetric side portions.
Figure 19:
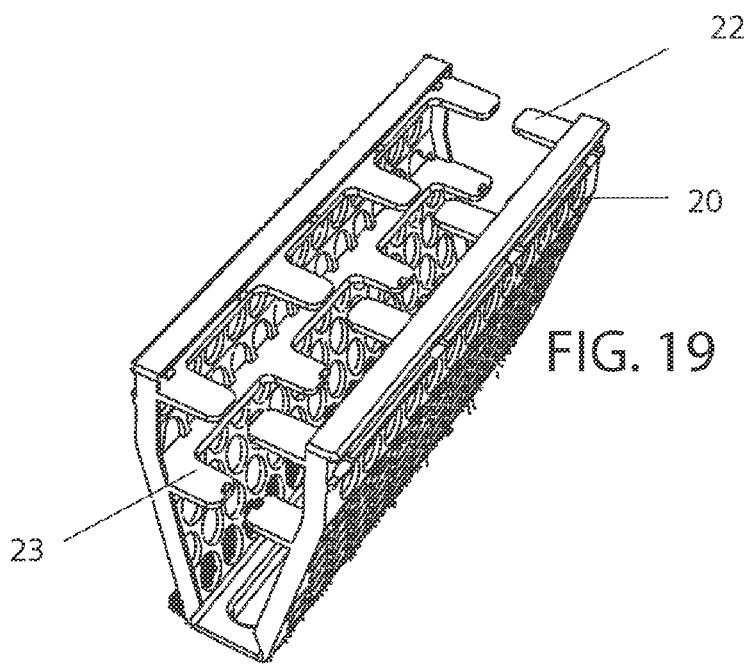

FIGS. 18 and 19 show a second embodiment of an aeroponic growing basket 10'. In this version, one basket is formed by interconnecting two separate, identical side portions. The base is formed by interlocking structures 21 at the bottom of each side portion. By having the basket comprised of two separatable sides it can be easier to access plants. Other tabs, including upper 22 and lower 23 provide for holding of foam blocks.

Third Embodiment Basket

The third embodiment basket is comprised of paired sides that are readily mutually attachable and detachable as in the second embodiment above. However the attachment is via a snapping, pivotable joint.

Figure 20:
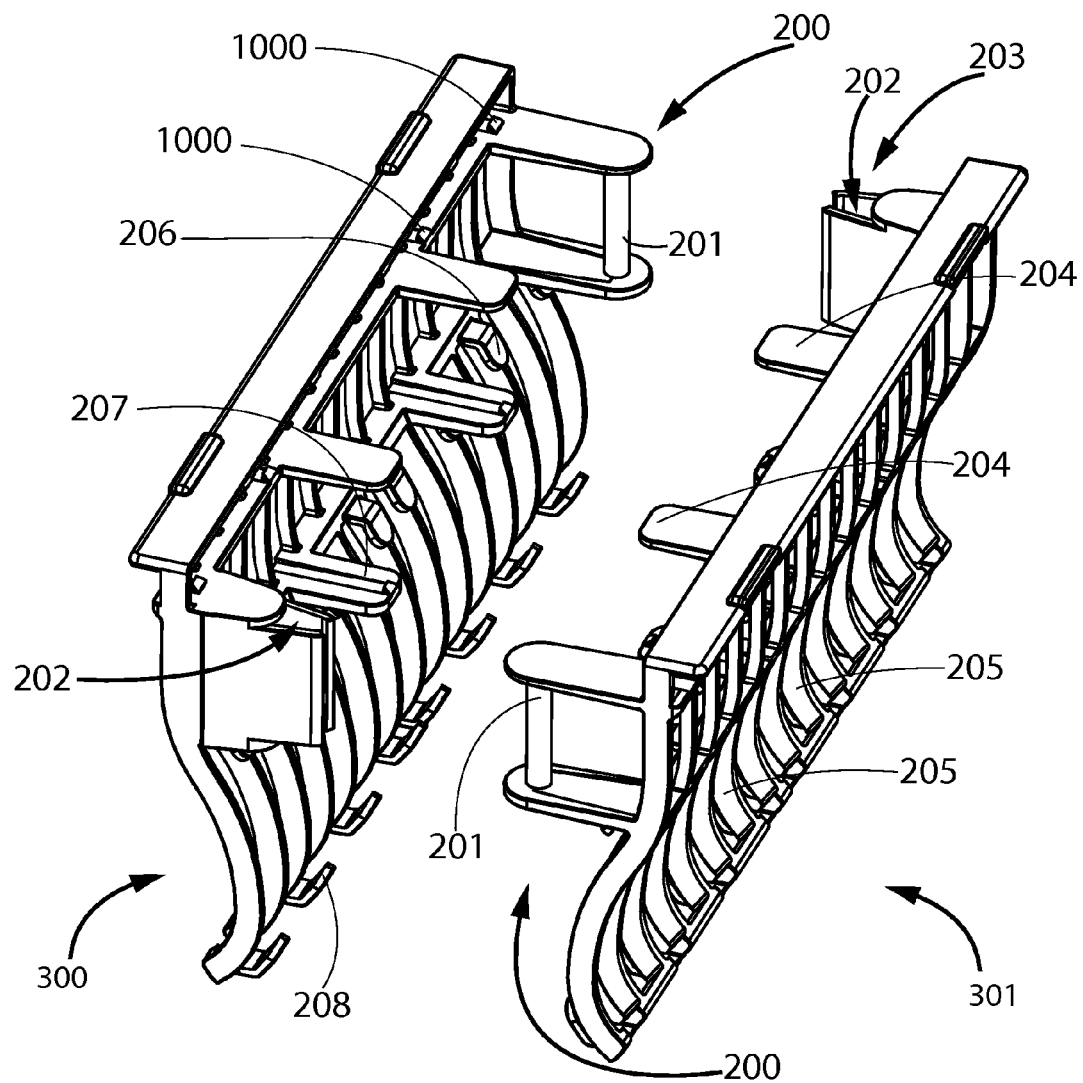
FIG. 20 shows a perspective view of a third embodiment basket comprised of two symmetric sides detached from each other in an exploded view.
Figure 24:
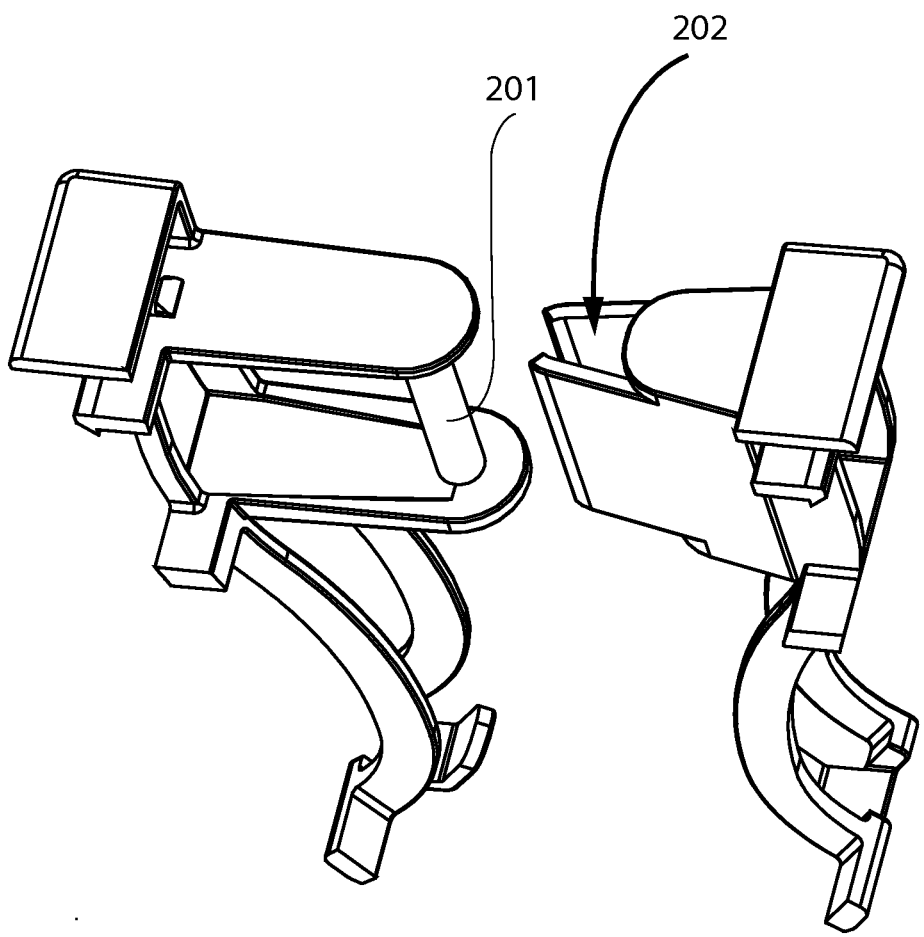
FIG. 24 shows a sectional perspective illustrating the snap mechanisms in a connected configuration

As seen in FIG. 20 the two sides are identical in structure. The left side 300, as seen in that view has fourteen curved ribs 205. At the near end there is a snap receptacle 203 with an opening 202. The far end has a complementary snap moiety 200 with a mating post 201. As is made clear in the figures, the opposing ends of the left side portion are not configured to mate with each other, but with the complementary structures of the side of the basket 301. Although described as a snap fit, the coupling structures might also be a friction fit. FIG. 24 shows the snap mechanism in isolation.

Figure 21:
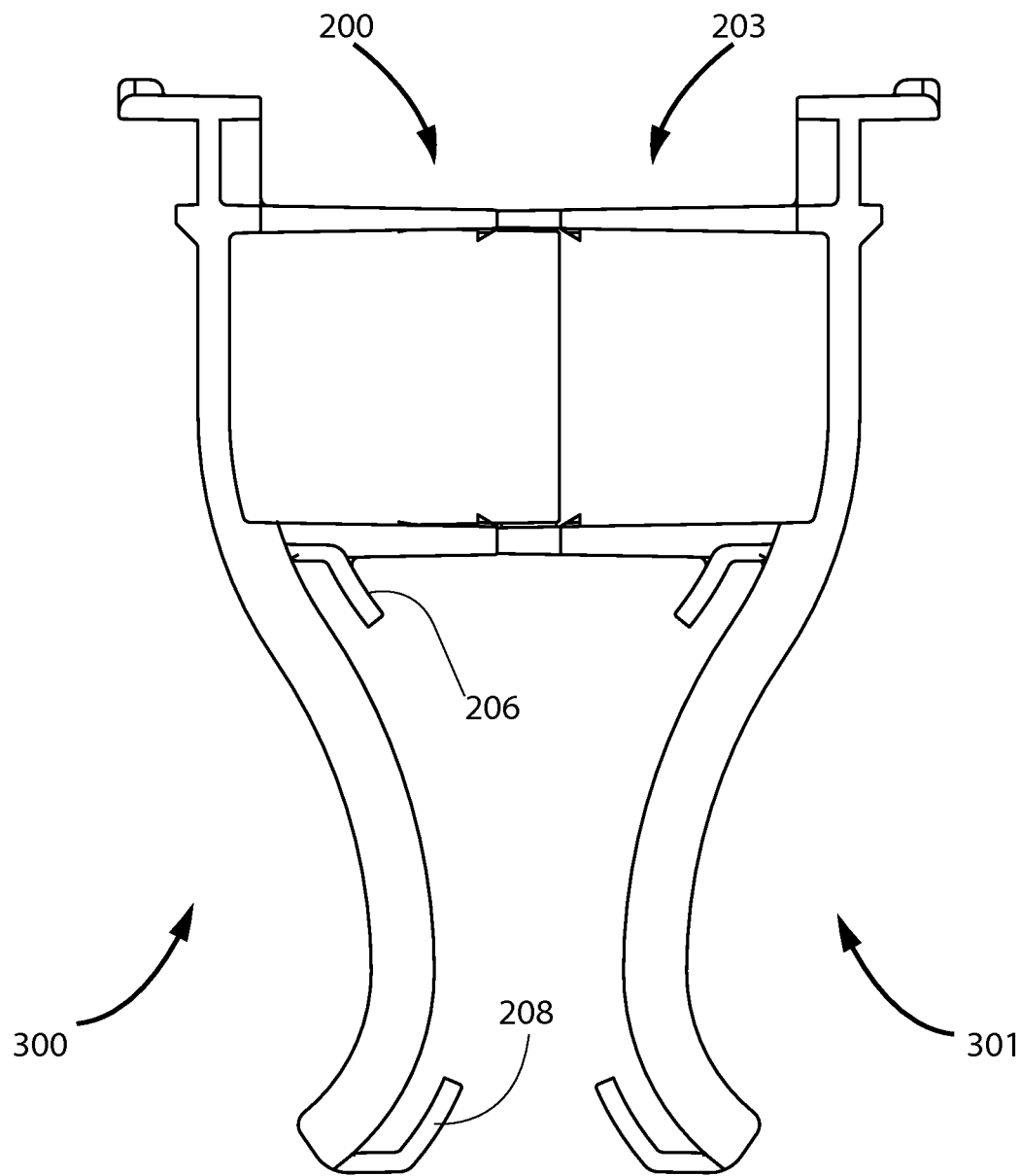
FIG. 21 shows an end view of the basket of FIG. 20.

FIG. 21 shows an end view of the basket in an assembled state without foam blocks or the light blocking fabric. This embodiment uses a light blocking fabric (not shown) in a similar manner as that in the first embodiment seen in FIG. 1. The fabric can be retained by clips 1000 seen in several figures including FIGS. 20 and 22.

Figure 23:
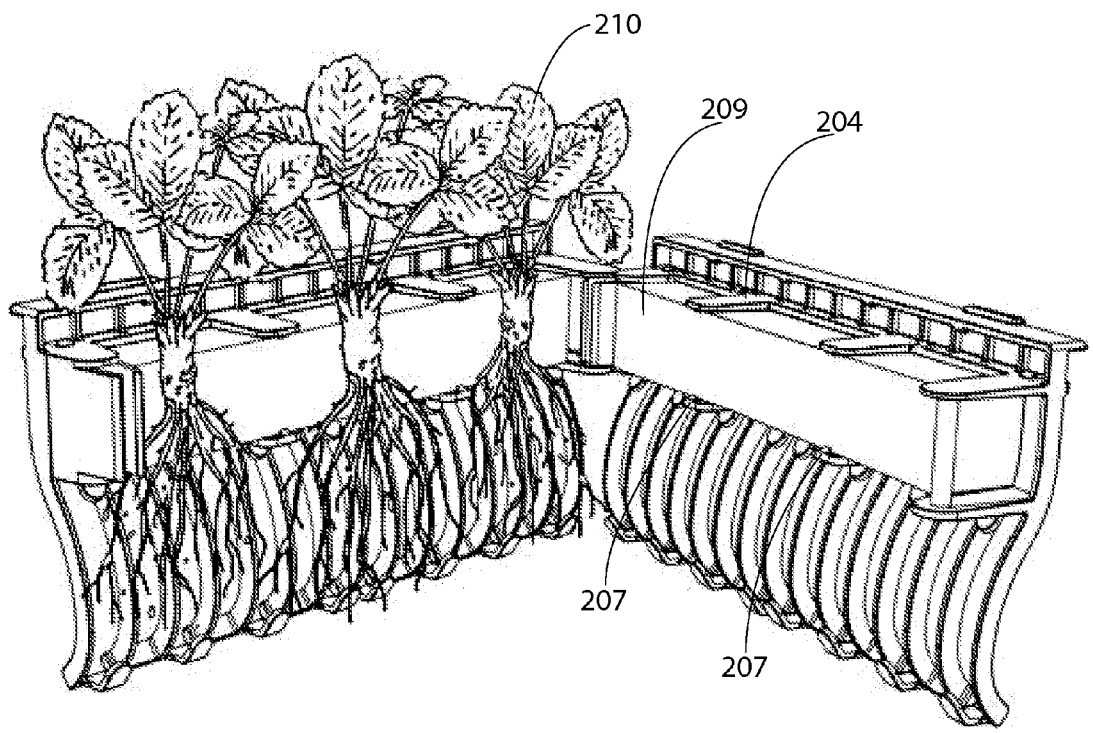
FIG. 23 shows the basket of FIG. 20 with the sides attached at one end and in a hinged position, seen with foam block and plants.

In FIG. 23 the two sides 300 301 are seen with one end of each mutually coupled to each other by the snap mechanism. Plants2. 10 are seen up against the left side foam block 209.

The foam blocks are seen to be held in place by be between lower tabs 207 and upper tabs 204. The cylindrical nature of the post and the shape 200 of the opening in its mating opening provide for a pivotable coupling. This allows ready access to the plants at their various stages of growth.

Figure 22:
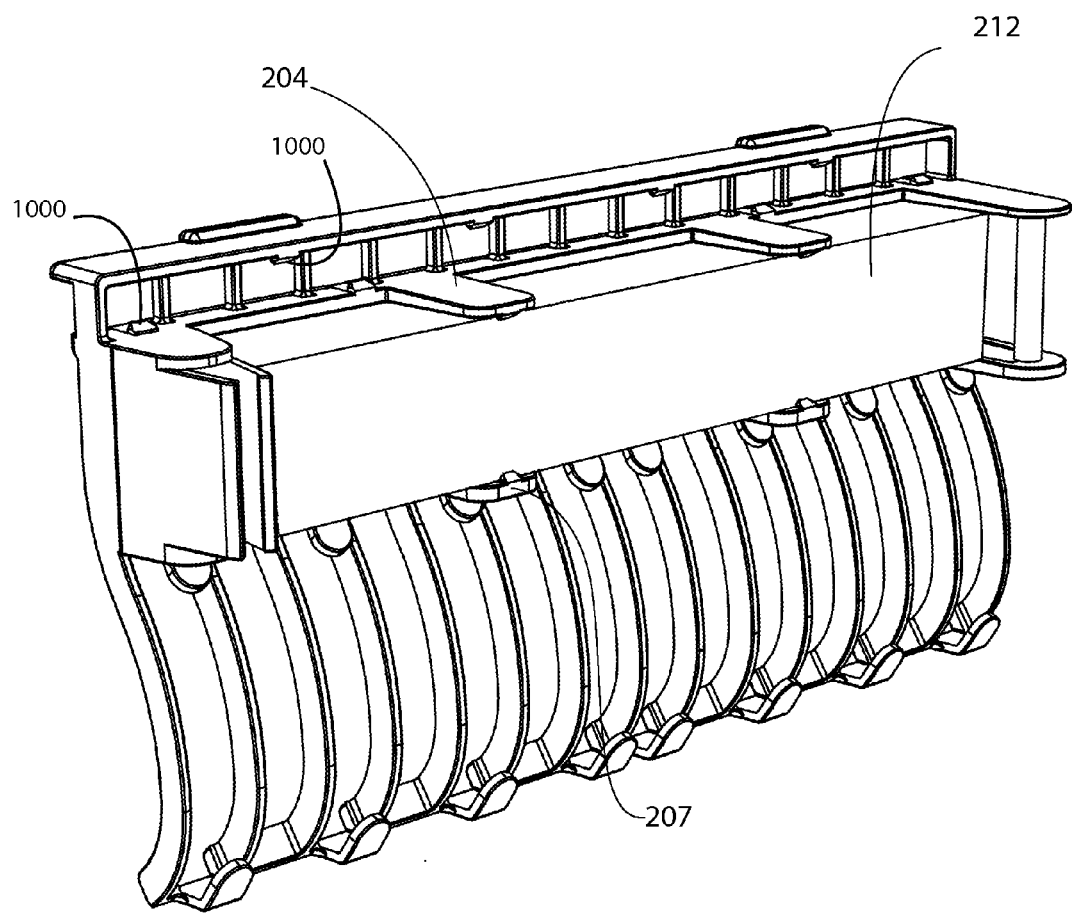
FIG. 22 shows one side of the basket of FIG. 20 with foam blocks.
Figure 26:
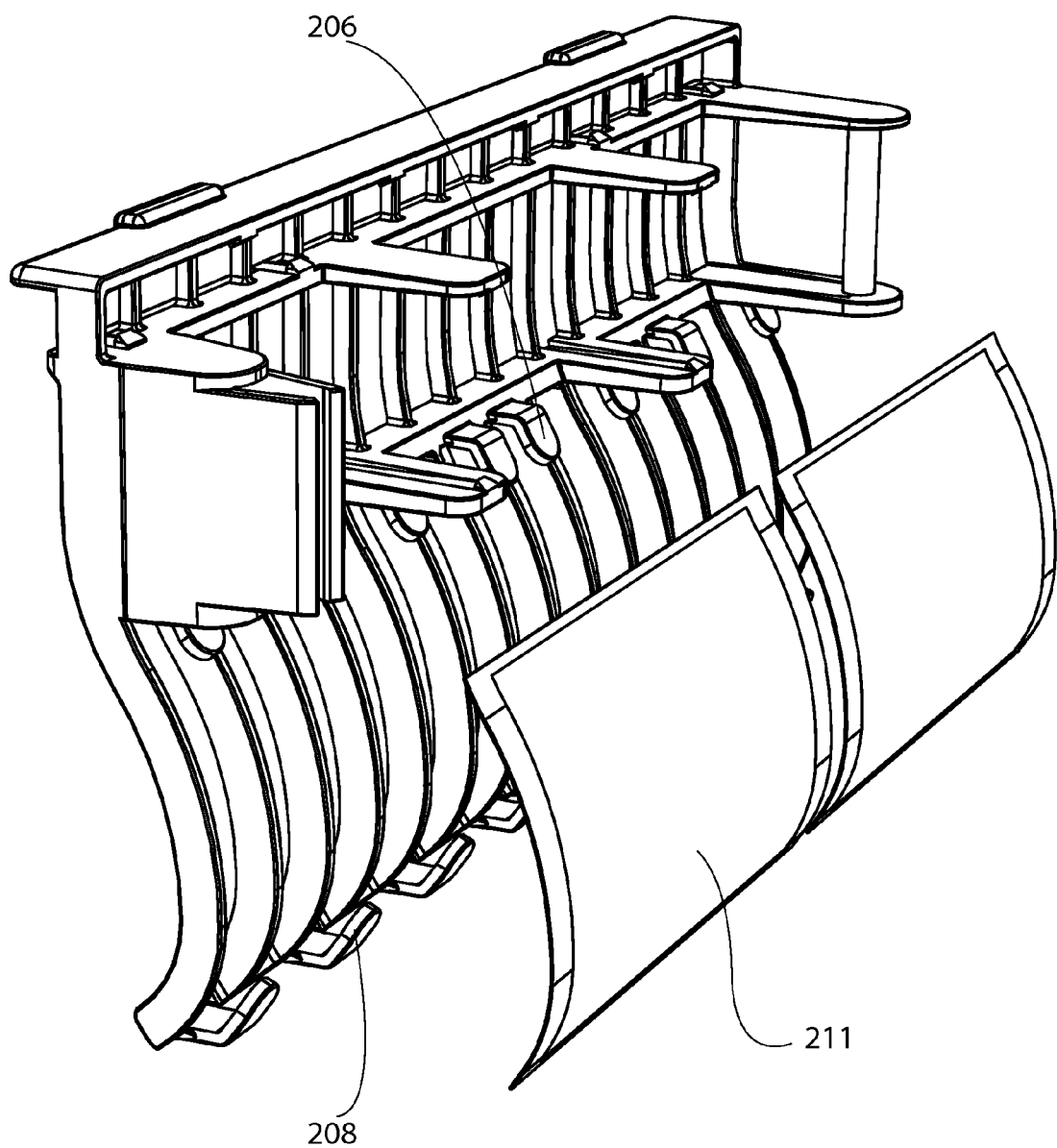
FIG. 26 shows an exploded view of the basket with nutrient bags

There are two lower foam support tabs 207 and two upper foam support tabs 204 on each side portion of the basket. The foam supports are used to hold a foam block, as seen in FIG. 22. Besides the foam block held in the upper portion of the basket, a permeable bag of nutrients can be held in the lower portion of the basket along the ribs. In some cases the bag may contain mycorrhizal related substances. The lower hooks 208 at the bottom of the ribs can cooperate with the upper hooks 206 at the top of the curved ribs. A nutrient bag 211 is seen to be supportable by these hooks in the exploded illustration of FIG. 26.

Figure 25:
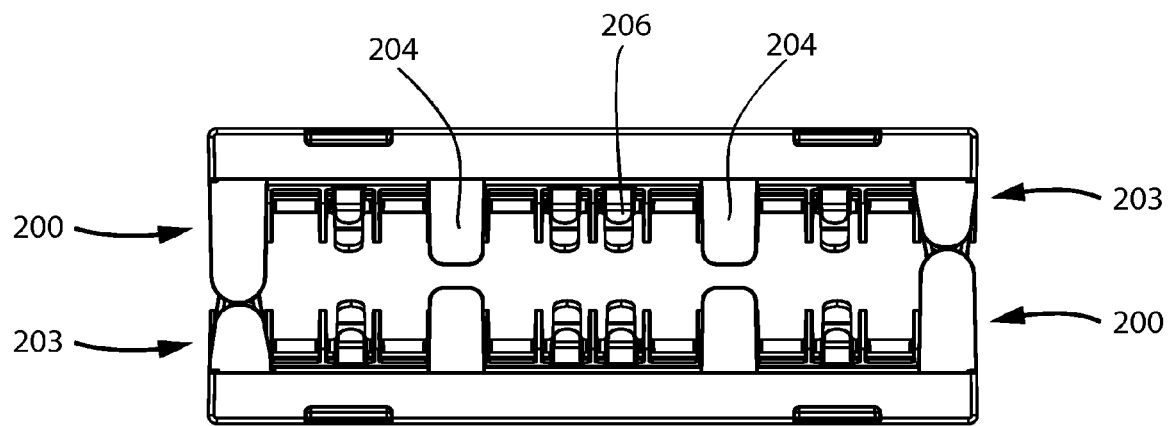
FIG. 25 is a top view of the basket of FIG. 20 in the attached position.
Figure 27:
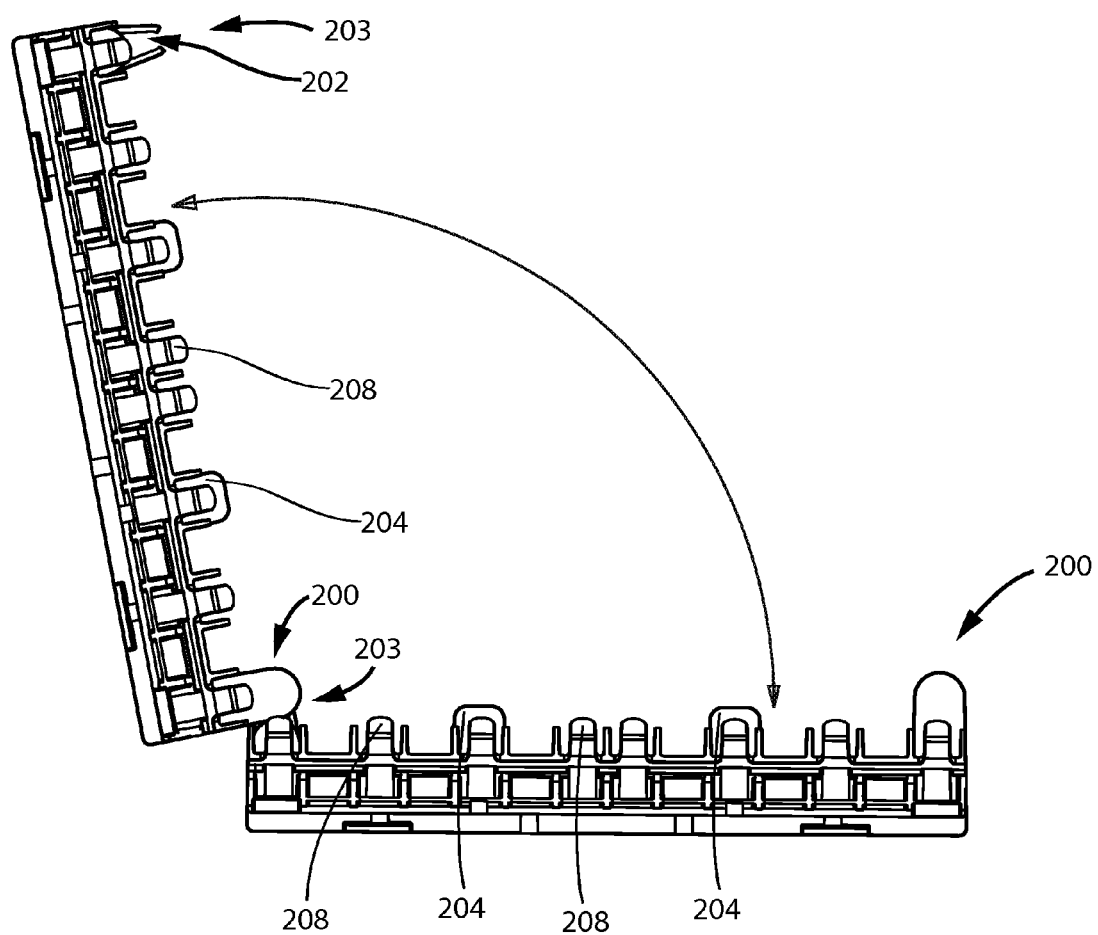
FIG. 27 is a bottom view of the basket and hinged position of FIG. 22.

FIG. 25 shows a top view of this basket in an assembled state. The snap moieties 200 are coupled to their mating moieties 203 at each of the opposing ends of the basket. The hinging is further illustrated in the bottom view of FIG. 27.

Those skilled in the art will be aware of materials, techniques and equipment 215 suitable to produce the example embodiments presented as well as variations on those examples. This teaching is presented for purposes of illustration and description but is not intended to be exhaustive or limiting to the forms disclosed. Many modifications and variations will be apparent to those of ordinary skill in the art. The embodiments and versions help to explain the principles of the invention, 220 the practical application, and to enable others of ordinary skill in the art to understand it. Various embodiments with various modifications as are suited to the particular application contemplated are expected.

In the following claims, the words "a" and "an" should be taken to mean "at least one" in all cases, even if the wording "at least one" appears in one or more claims explicitly. The scope of the invention is set out in the claims below.

What is claimed:

1. A plant support basket for aeroponic growing comprising a V-shaped or U-shaped open trough that includes two opposing sidewalls each having a plurality of openings for roots to exit the basket; further at least one sidewall of the two opposing sidewalls comprising inwardly extending tabs supporting a coupled resilient porous block.

2. The plant support basket of claim 1 further comprising a light-blocking fabric coupled to the trough such as to be held in a position over the trough's upper opening.

3. The plant support basket of claim 1 further comprising a porous, flat bag suitable for containing nutrients along the inside of at least on of the sidewalls.

* * * * *